United States Patent [19]

Yonezawa et al.

[11] 4,260,536

[45] Apr. 7, 1981

[54] SILICONE COMPOSITION PRODUCED BY EXTRUSION AND HOT AIR VULCANIZATION

[75] Inventors: Masaharu Yonezawa, Gumma; Masayuki Hatanaka, Ouramachi, both of Japan

[73] Assignee: General Electric Company, Waterford, N.Y.

[21] Appl. No.: 943,423

[22] Filed: Sep. 18, 1978

[30] Foreign Application Priority Data

Sep. 26, 1977 [JP] Japan .................. 52-115366

[51] Int. Cl.$^3$ ............................................. C08L 83/06
[52] U.S. Cl. ........................... 260/37 SB; 525/478; 528/24
[58] Field of Search ............. 260/375 B, 825; 528/24, 528/31, 32; 525/478

[56] References Cited

U.S. PATENT DOCUMENTS

| | | |
|---|---|---|
| 3,050,485 | 8/1962 | Nitzsche et al. .................. 260/825 X |
| 3,231,542 | 1/1966 | Eisinger et al. .............. 260/375 B X |
| 3,832,420 | 8/1974 | Clark ............................ 260/375 B X |
| 3,992,355 | 11/1976 | Itoh et al. ............................ 525/478 |
| 4,020,014 | 4/1977 | Service et al. ....................... 525/478 |
| 4,108,833 | 8/1978 | Hatanaka et al. ............. 260/375 B X |
| 4,144,206 | 3/1979 | Symeon ............................ 528/24 X |

*Primary Examiner*—Wilbert J. Briggs, Sr.
*Attorney, Agent, or Firm*—Michael J. Doyle; John L. Young; E. Philip Koltos

[57] ABSTRACT

A heat vulcanizable silicone rubber composition which is capable of being extruded by an extruder and vulcanized by hot air comprising a gum, silica filler and organohydrogenpolysiloxane and as the curing catalyst a combination of an aromatic acylorganicperoxide and an alkylorganicperoxide. The advantage of the above composition is that it can be vulcanized by hot air and the cured product is not sticky.

21 Claims, No Drawings

SILICONE COMPOSITION PRODUCED BY EXTRUSION AND HOT AIR VULCANIZATION

BACKGROUND OF THE INVENTION

This application claims priority over Japanese Patent Application Ser. No. 115366/77 filed Sept. 26, 1977.

This invention pertains to the molding of silicone rubber tubes from heat-vulcanized silicone rubber composition by using the processes of extrusion and hot air vulcanization. In particular, it is a method which significantly improves the condition of the silicone rubber tube surface by processing the silicone rubber compound composed of the above-mentioned materials through extrusion, hot air vulcanization, and the application of appropriate post vulcanization as necessary. The term "hot air vulcanization" in this specification refers to the process wherein a non-vulcanized rubber compound is passed through hot air for a short time in a vulcanizing furnace heated to more than 200° C.; similarly, the term "post-vulcanization" refers to the process whereby the product which was vulcanized by the hot-air method or any other method is exposed to hot air to complete its vulcanization.

Conventionally, either of the following methods is used in the manufacturing of silicone rubber tubes by hot-air vulcanization.

The first method calls for the mixing of the silicone rubber compound composed of silica powder and silicone rubber gum which is a high-polymer methylvinylpolysiloxane, with an aromatic acylorganicperoxide such as 2,4-dichlorobenzoylperoxide in catalytic amounts as the vulcanizing agent, followed by its extrusion by an extruder into a furnace heated to 200°–400° C. to perform hot-air vulcanization. In this instance, sometimes the compound is not extruded directly into the heating furnace by the extruder, but is preheated by a burner or heater.

The second method calls for the mixing of the silicone rubber compound composed in substance of silica fine powder and silicone rubber gum which is a high polymer methylvinylpolysiloxane with organohydrogenpolysiloxane as a bridging agent, and a platinum compound as a catalyst, followed by its extrusion into a furnace heated to 200°–400° C. by an extruder to perform its vulcanization.

In the first method, although there are no problems in roll-workability, scorching or extrusion; the tube surface remains adhesive after the process of hot-air vulcanization. This adhesion stays even after the silicone rubber tube produced by this method goes through a post-vulcanization treatment at a high temperature inside a dryer. In instances where silica fine powder is treated superficially with an organic silicon compound to produce a transparency of the silicone rubber tube, the problem of surface adhesion is particularly marked. The silicone rubber tube produced by the second method displays a superior surface finish with no adhesion problems. However, the method has its drawbacks in that the pot life and shelf life of the composition stability during the process and before vulcanization is not as good as would be desired. In addition, the composition is easily scorched.

SUMMARY OF THE INVENTION

The present inventors studied various methods of eliminating the surface adhesion which is a shortcoming in the above-mentioned first method of conventional hot-air vulcanization using organic peroxide. They found that by adding an appropriate amount of organohydrogenpolysiloxane to the silicone rubber compound, and by using an aromatic acylorganicperoxide and an alkylorganicperoxide together as vulcanizing agents, a silicone rubber tube without surface adhesion could be produced by hot-air vulcanization, with an application of post-vulcanization as required.

This invention covers a silicone rubber tube composition formation wherein the following components of silicone rubber are extruded by an extruder and vulcanized by hot air.

(a) 100 parts by weight of organopolysiloxane composed of units expressed by the general formula $R_a{}^1SiO_{(4-a)/2}$ wherein $R^1$ indicates a substituted or a non-substituted monovalent hydrocarbon group, of wherein 0.02–2 mole % consists of an alkenyl group, and a varies in the 1.98–2.002 range;

(b) 30–100 parts by weight of silica fine powder;

(c) 0.1–1.0 parts by weight of organohydrogenpolysiloxane possessing units expressed by the general formula $R_b{}^2HcSiO_{(4-b-c)/2}$ wherein $R^2$ is a substituted or non-substituted monovalent hydrocarbon group, b and c are positive values, and the total of b+c falls in the 1.0–3.0 range, wherein the molecule contains at least 2 silicone bonded hydrogen atoms.

(d) 0.3–3 parts by weight of aromatic acylorganoicperoxide, and (e) from 0.1–2 parts by weight of alkylorganicperoxide which composition is pushed out of an extruding device and vulcanized by hot air.

DESCRIPTION OF THE PREFERRED EMBODIMENT

The diorganopolysiloxane used conventionally in the making of silicone rubber meets the gum component needs of (a) in this present invention. In substance, such gums are composed of diorganosiloxane units, but may also include small amounts of triorganosiloxane units, monoorganosiloxane units, if the number of organic groups remain within the range of 1.98–2.002 per 1 atom of silicon.

Also molecular ends may be blocked by a hydroxyl or triorganosiloxane group. The organic group bonded to the silicon atom is selected from substituted or non-substituted monovalent hydrocarbon groups, but the methyl radical or phenyl radical is preferred because of the easier synthesis and heat resistance of the gums. Also, it is necessary to include an alkenyl group such as a vinyl group in the range of 0.2–2 mole percent of total organic groups to effectively promote vulcanization. Such diorganopolysiloxane used may be a single chemical structure or may be a mixture of different chemical structures. However, its degree of polymerization is preferred to remain within the 3,000–10,000 range. If the degree of polymerization is lower than this range, satisfactory mechanical properties of the cured rubber cannot be achieved, and if greater workability is hindered.

The components of (b) as used in this invention are filler agents such as fumed type silica, precipitated silica, silica aerogel, and pyro-silica. These may be used as they are or may be treated with an organic silicon compound selected from organochlorosilane, chain or cyclic organopolysiloxane or organosilazanes. Surface treatment may be conducted by adding an organosilazane to a combination of components (a) and (b) before the process of heating and kneading. This kind of silica powder filler may be used either independently or in a combination. The amount of silica fine powder to be compounded is selected from the range of 30-100 parts by weight to 100 parts by weight of organopolysiloxane as mentioned in (a). If this amount is less than 30 parts by weight or greater than 100 parts by weight, the silicone rubber tube will not have the necessary physical properties for the purpose of this invention.

Component (c) used in this invention must be an organohydrogenpolysiloxane possessing at least 2 silicon bonded hydrogen atoms within each molecule. The amount of compound depends on the number of silicon-hydrogen bonds within the organohydrogenpolysiloxane, and lies in the range of 0.1-1.0 parts by weight per 100 parts by weight of organopolysiloxane. If the amount of hydrogen compound is less than this range, its effectiveness is weakened, and if greater, it causes foaming during the thermal vulcanization process. The organohydrogenpolysiloxane itself may take many forms, from a straight chain low molecular weight compound to a high molecular weight compound, and from compounds with branch chains on cyclic configuration to resin type of compounds.

Organic peroxide (d) and (e) used in this invention may be those conventionally used for organic peroxide vulcanized silicone rubber. Each catalytic amount of aromatic peroxide (d), and alkylorganicperoxide (e) must be jointly used. Peroxides such as benzoyl peroxide, p-chlorobenzoyl peroxide and 2,4-dichlorobenzoyl peroxide are examples of the aromatic acylorganic-peroxide (d), but the 2,4-dichlorobenzoyl is preferred particularly because of its low decomposition temperature. The amount used ranges between 0.3-3 parts by weight to 100 parts by weight of organopolysiloxane. If this amount falls lower than 0.3 parts by weight, adequate vulcanization cannot take place; and if it is greater than 3 parts by weight, adverse effects are seen in the properties of the silicone rubber end product. Ditertiary butylperoxide, dicumylperoxide, tertiarybutylcumyl-peroxide, 2.5 dimethyl-2.5-ditertiarybutylperoxyhexane are examples of some of the alkyl organic peroxides of (e). The amount used ranges from 0.1-2 parts by weight to 100 parts by weight of organopolysiloxane of (a). If this amount is less than 0.1 parts by weight, surface adhesion of the silicone rubber tube will remain, and its effectiveness will not increase even if the amount used may be greater than 2 parts by weight.

In addition, a low molecular weight diorganopolysiloxane with hydroxyl radical or alkoxy radical at the two ends may be added as a processing aid to the silicone rubber compound composed of the components listed from (a) to (e). Also in instances where oil resistance or hardness is required, ground silica, diatomaceous earth, or pyro-vermiculite may be added as a non-reinforcing filler, although such fillers will cause the transparency of the product to be lost. Various coloring agents may be added if coloring is desired.

When the silicone-rubber compositions consisting of the ingredients (a) to (e) are extruded by an extruder, and for 20 seconds to 10 minutes passed through a hot air heating furnace maintained at a temperature of approximately 200° to 400° C., there is obtained a silicone rubber tube with no surface adhesion problems. If the components used are only those listed in (a) to (e) without additives or with the addition of appropriate processing aids, we obtain a transparent silicone rubber tube. Even if a slight surface adhesion remains after the hot air vulcanizing process mentioned above, a post-vulcanizing process lasting several hours will remove that adhesion completely. The product of the instant case cannot be achieved without organohydrogen-polysiloxane (c). The same problem also arises if the only vulcanizing agent used is the aromatic acylorganic peroxide (d). The removal of adhesiveness is achieved only after the joint use of proper amounts of alkylorganic peroxide and item (d).

As for the technique similar to our invention involving the addition of organohydrogenpolysiloxane to the silicone rubber composition with organopolysiloxane as its main component, the former uses polyorganosiloxane gum containing vinyl group and cures with a peroxide while the latter uses vinyl groups as a bridging agent in so-called addition polymerization type silicone rubber composition. However, this technique uses platinum series as catalyst and is different from our invention in its bridging structure, and its usage of the organohydrogenpolysiloxane. A method similar to our present invention in its bridge structure was made public in the Japanese patent, Issue No. 93658, 1973, where at least one kind of calcium compound selected from a group of $CaH_2$, $Ca(OH)_2$, $CaO$ and $CaO_2$ is jointly used with a silica filling agent and where organohydrogen polysiloxane is also added. However, this technique aims for the manufacture of silicone rubber which does not need post-vulcanization, and which is also superior in heat resistance and steam resistance, thus making it dissimilar to the purposes of this invention. Also the inorganic filler is markedly different in its composition from the one mentioned earlier. Moreover, it is proposed in the specifications stated in the patent application, Japanese No. 56834, 1977 submitted by this applicant that the addition of organohydrogenpolysiloxane to the combination of organopolysiloxane gum, silica filler treated with organopolysiloxane, and organic peroxides, that it will prevent the coloring of silicone rubber after thermal vulcanization. Thus this technique is different from this invention in its purpose, and also makes no reference to the joint use of an aromatic acylorganic-peroxide and alkyl-organic peroxide as defined by our invention.

Compared to the silicone rubber tube produced by the conventional hot air vulcanization method using organic peroxides, the tube molding method of this invention produces a tube without surface adhesion, and characterized by a beautiful external appearance, giving it an exceedingly high product value. Also in contrast to hot air vulcanization using platinum compounds, this composition has a stable pot life in its operation before vulcanization and also does not entail the problem of scorching.

The silicone rubber tube produced by this method is used for automatic food vending machines and medical supplies.

Examples of the practical uses of this invention are given below by illustrating actual examples. However, the actual usages are not confined to only these cases. In the examples all parts are expressed in parts by weight.

EXAMPLE 1

To 100 parts of dimethylpolysiloxane crude rubber (degree of polymerization 8,000) containing 0.1 mole percent methylvinylsiloxane units blocked at both ends by trimethylsilyl, 40 parts of fumed silica treated on its surface in advance by 4.0 weight percent of hexamethyldisilazane (viscosity of 20 cSt) as a processing aid are kneaded therein by a Banbury mixer. This mixture is then heated and kneaded for two hours at 170° C. to produce a silicone rubber compound. Taking this silicone rubber compound as the base material, a methylhydrogenpolysiloxane expressed by the average formula $(CH_3)_3SiO[(CH_3)HSiO]_{58}Si(CH_3)_3$ and organic peroxides are compounded with it to produce 11–13 reference products for comparison as listed in Table 1, and 14–17 products produced by the method of this invention. These compounds were extruded individually by an extruder into the heating furnace and vulcanized by hot air for one minute at 300° C.

(Experiment 1). Under similar conditions, another test was conducted involving a 2-hour post vulcanization at 200° C. carried out after the hot-air vulcanization (Experiment 2). Adhesion of the inner wall and outer wall of the transparent silicone rubber tube obtained in Experiments 1 and 2 were studied. The results as shown in Table I demonstrate the clear effectiveness of our method in preventing adhesion.

comparison) displayed adhesion on their inner walls even after post-vulcanization.

EXAMPLE 3

To 100 parts of diorganopolysiloxane gum (degree of polymerization 5,500) consisting of 0.2 mole percent methylvinylsiloxane units, 6.8 mole percent diphenylsiloxane units and 93.0 mole per cent dimethylsiloxane units, and blocked at the ends by dimethylvinylsilyl, 40 parts of fumed silica filler, 5 parts of α, ω-dihydroxypolydiorganosiloxane (viscosity 80 centistokes at 25° C.) consisting of 30 mole percent diphenylsiloxane units and 70 mole percent dimethylsiloxane units are well kneaded in a kneader. The ingredients are then heated and kneaded for 4 hours at 150° C. to produce a silicone rubber compound. To 0.5 parts of methylhydrogenpolysiloxane expressed by the average chemical formula $(CH_3)_3SiO$ $[(CH_3)HSiO]$ 18 $[(CH_3)_2SiO]_{1.2}Si(CH_3)_3'$ there is added 1.5 parts of 48 percent concentration paste produced by mixing 2,4-dichlorobenzoyl

TABLE I

|  |  |  | Compositions of Comparative Examples | | | Compositions in this Invention | | | |
| --- | --- | --- | --- | --- | --- | --- | --- | --- | --- |
|  |  |  | 11 | 12 | 13 | 14 | 15 | 16 | 17 |
| Silicone rubber compound | | | 100 | — | 100 | 100 | 100 | 100 | 100 |
| Methylhydrogenpolysiloxane | | | 0.5 | — | — | 0.5 | 0.5 | 0.5 | 0.5 |
| 48% paste of 2,4-dichlorobenzcyl peroxide *1 | | | 1.2 | 1.2 | 1.2 | 1.2 | 1.2 | 1.2 | 1.2 |
| Ditertiarybutylperoxide | | | — | — | 0.2 | 0.2 | — | — | — |
| Dicumyl peroxide | | | — | — | — | — | 0.2 | — | — |
| Tertiary butylcumylperoxide | | | — | — | — | — | — | 0.2 | — |
| 2,5-dimethyl-2,5-ditertiary-butylperoxyhesan | | | — | — | — | — | — | — | 0.2 |
| Adhesion | Experiment 1 | Outer Wall | ⊙ | ○ | ⊙ | ⊙ | ⊙ | ⊙ | ⊙ |
| | | Inner Wall | X | X | X | ○ | ○ | ○ | ○ |
| | Experiment 2 | Outer Wall | ○ | ⊙ | ○ | ⊙ | ⊙ | ⊙ | ⊙ |
| | | Inner Wall | X | X | X | ⊙ | ⊙ | ⊙ | ⊙ |

Remarks:
*1 Paste kneaded with silicone oil
*2 There is adhesion
⊙ No adhesion
○ Almost no adhesion
X Adhesion

EXAMPLE 2

To 100 parts of dimethylpolysiloxane crude rubber (degree of polymerization 7,000) containing 0.2 mole percent of methylvinylsiloxane units and blocked at the ends by trimethylsilyl group, 40 parts of fumed silica filler treated in advance with 5 weight per cent of octamethylcyclotetrasiloxane, 20 parts of precipitated silica, and 8 parts of α, ω-dihydroxypolydimethylsiloxane (viscosity 20 centistokes) are kneaded well in a kneader. The ingredients are then heated for 3 hours at 160° C. to produce a silicone rubber compound. Then 0.7 parts of methylhydrogenpolysiloxane consisting of $(CH_3)_2HSiO_{0.5}$ units 66.7 mole percent and $SiO_2$ unit 33.3 mole per cent is mixed with 1.2 parts of 48 percent concentration paste produced by adding silicone oil to 2.4 dichlorobenzoyl peroxide, and 0.3 parts of ditertiarybutyl. This paste is added by using two rollers into 100 parts of this silicone rubber compound to produce a silicone rubber composition. This silicone rubber composition is extruded into a hot air vulcanizing furnace and vulcanized for 30 seconds at 320° C., followed by 4 hours of post-vulcanization at 180° C. The end product is a transparent non-adhesive silicone rubber tube. In contrast, the composition which lacked methylhydrogenpolysiloxane or ditertiarybutyl peroxide (both products used for peroxide with silicone oil, and 0.3 parts of dicumyl peroxide. The mixture is extruded into a tube shape and vulcanized by hot air for 1.5 minutes at 280° C. The process is followed by a post-vulcanization of 4 hours at 200° C. to produce a good transparent silicone rubber tube without any adhesion.

EXAMPLE 4

To 100 parts of dimethylpolysiloxane crude rubber (degree of polymerization 8,555) containing 0.2 mole percent of methylvinylsiloxane units and blocked at the ends with dimethylvinylsilyl, 40 parts of fumed silica, filler, 10 parts of α, ω-dimethyoxydimethylpolysiloxane (viscosity 15 centistokes at 25° C.), and 1.5 parts of hexamethyldisilazane are well kneaded in a kneader, and then heated and kneaded for three hours at 180° C. After the ingredients are cooled to less than 160° C., they are scoured using two rollers with 1.0 part of methylhydrogenpolysiloxane expressed by average chemical formula $(CH_3)_3SiO$ $[(CH_3)HSiO]_{20}Si$ $(CH_3)_3$, 1.5 part of past of 50 percent concentration consisting of p-chlorobenzoyl peroxide scoured with silicone oil, and 0.3 parts of 2,5-dimethyl-2,5-ditertiarybutylperoxyhexane. The ingredients are extruded in tube form, and vulcanized by hot air for 1 minute at 320° C., followed by a post vulcanization of 4 hours at 180° C. A transparent non-adhesive silicone rubber tube is obtained.

EXAMPLE 5

The silicone crude rubber used consisted of dimethylpolysiloxane (degree of polymerization 8,500) with 0.2 mole per cent methylvinylsiloxane units and blocked at the end with hydroxyl radical and the same materials as in Example 2. The ingredients are kneaded, extruded, vulcanized by hot air, and post-vulcanized. The end product was a transparent non-adhesive silicone rubber tube.

EXAMPLE 6

The materials used in Example 6 are the same as those in Example 3 except for the gum of that Example there was used 88 parts of dimethylpolysiloxane gum (degree of polymerization 8,000), containing 0.1 mole percent of methylvinylsiloxy and blocked at the ends by trimethylsilyl groups, 12 parts of diorganopolysiloxane gum (degree of polymerization 5,000) composed of 8 mole percent of methylvinylsiloxy units, 5 mole percent methyl (3, 3, 3-trifluoropropyl) siloxy unit, and 87 mole percent dimethylsiloxy units.

There was also used 45 parts of fumed silica filler, 20 parts of ground silica, and 8 parts α, ω-dihydroxymethylpolysiloxane (viscosity 20 centistokes at 25° C.). The ingredients are kneaded well, extruded, vulcanized by hot air, and post-vulcanized. A non-adhesive silicone rubber tube is the end product.

EXAMPLE 7

The ingredients used here are the same as the materials used in Example 1 except for the usage of 0.4 parts of

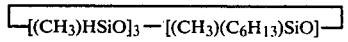

as a methylhydrogenpolysiloxane in place of the hydrogenpolysiloxane of Example 1. The ingredients are prepared, extruded, and vulcanized by hot air for 2 minutes at 280° C. This produced a non-adhesive transparent rubber tube.

We claim:

1. A composition which is capable of being extruded by an extruder and vulcanized by hot air, which is not sticky in the cured form, consisting essentially of: (a) 100 parts by weight of organopolysiloxane gum composed of units expressed by the general formula $R_a{}^1SiO_{(4-a)/2}$ where $R^1$ is a substituted or a non-substituted monovalent hydrocarbon group, of which 0.02-2 mole percent is an alkenyl group and a varies in the range of 1.98-2.00; (b) 30-100 parts by weight of a silica filler; (c) 0.1-1.0 parts by weight of organohydrogenpolysiloxane possessing units expressed by the general formula $R_b{}^2HcSiO_{(4-b-c)/2}$ where $R^2$ is a substituted or non-substituted monovalent hydrocarbon group, b and c are positive values, and the total of b plus c falls in the 1.0-3.0 range, and wherein the molecule contains at least 2 silicon bonded hydrogen atoms; (d) 0.3-3 parts by weight of an aromatic acylorganicperoxide, and (e) 0.1-2 parts by weight of an alkylorganicperoxide.

2. The composition of claim 1 in which the alkenyl group in the organopolysiloxane polymer is vinyl and wherein $R^1$ is methyl and vinyl.

3. The composition of claim 1 wherein the silica filler is selected from the class consisting of fumed silica and precipitated silica.

4. The composition of claim 3 wherein the silica filler is treated with silicone compounds selected from cyclicpolysiloxanes and silazanes.

5. The composition of claim 1, wherein the aromatic acylorganicperoxide is 2,4-dichlorobenzoylperoxide.

6. The composition of claim 1 wherein the alkylorganicperoxide is ditertiarybutylperoxide.

7. A process for forming a cured heat vulcanizable silicone rubber composition which is vulcanized by hot air and is not sticky consisting essentially of (1) mixing (a) 100 parts by weight of organopolysiloxane gum composed of units expressed by the general formula $R_a{}^1SiO_{(4-a)/2}$ where $R^1$ is a substituted or a non-substituted monovalent hydrocarbon group of which 0.02-2 mole percent is an alkenyl group and a varies in the range of 1.98-2.00; (b) 30-100 parts by weight of a silica filler; (c) 0.1-1.0 part by weight of organohydrogenpolysiloxane possessing units expressed by the general formula $R_b{}^2HcSiO_{(4-b-c)/2}$ where $R^2$ is a substituted or non-substituted monovalent hydrocarbon group, b and c are positive values, and the total of b plus c falls in the 1.0-3.0 range, and wherein the molecule contains at least 2 silicon bonded hydrogen atoms; (d) 0.3-3 parts by weight of an aromatic acylorganicperoxide, and (e) 0.1-2 parts by weight of an alkylorganicperoxide to form a heat vulcanizable silicone rubber mixture and then (2) extruding the mixture by utilizing an extruder and (3) curing the composition by passing hot air in proximity thereto.

8. The process of claim 7 wherein the alkenyl group in the organopolysiloxane gum is vinyl and $R^1$ is methyl and vinyl.

9. The process of claim 7 wherein the silica filler is selected from the class consisting of fumed silica and precipitated silica.

10. The process of claim 9 wherein the silica filler is treated with a silicone compound selected from the class consisting of cyclicpolysiloxanes and silazanes and mixtures thereof.

11. Process of claim 7 wherein the aromatic acylorganicperoxide catalyst is 2,4-dichlorobenzoylperoxide.

12. The process of claim 7 wherein the alkylorganicperoxide is ditertiarybutylperoxide.

13. A process for forming a cured heat vulcanizable silicone rubber composition which is not sticky by extruding the uncured composition and then curing it by passing hot air in proximity thereto consisting essentially of (1) mixing (a) 100 parts by weight of organopolysiloxane gum composed of units expressed by the general formula $R_a{}^1SiO_{(4-a)/2}$ where $R^1$ is a substituted or a non-substituted monovalent hydrocarbon group, of which 0.02-2 mole percent is an alkenyl group and a varies in the range of 1.98-2.00; (b) 30-100 parts by weight of a silica filler; (c) 0.1-1.0 parts by weight of organohydrogenpolysiloxane possessing units expressed by the general formula $R_b{}^2HcSiO_{(4-b-c)/2}$ where $R^2$ is a substituted or non-substituted monovalent hydrocarbon group, b and c are positive values, and the total of b plus c falls in the 1.0-3.0 range, and wherein the molecule contains at least 2 silicon bonded hydrogen atoms; (d) 0.3-3 parts by weight of an aromatic acylorganicperoxide, and (e) 0.1-2 parts by weight of an alkylorganicperoxide (2) extruding the mixture through an extruder and (3) passing hot air heated to a temperature of in the range of 200°-400° C. in proximity to such extruded composition so as to vulcanize it.

14. The process of claim 13 wherein the alkenyl group in the organopolysiloxane gum is vinyl and $R^1$ is methyl and vinyl.

15. The process of claim 13 wherein the silica filler is selected from the class consisting of fumed silica and precipitated silica.

16. The process of claim 15 wherein the silica filler is treated with a silicone compound selected from the class consisting of cyclicpolysiloxanes and silazanes and mixtures thereof.

17. The process of claim 13 wherein the acylorganicperoxide is 2,4-dichlorobenzoylperoxide.

18. The process of claim 13 wherein the alkylorganicperoxide is ditertiarybutylperoxide.

19. The process of claim 13 wherein hot air is passed in proximity to the extruded composition in a hot air heated furnace wherein the extruded composition is maintained in a heated furnace for a period of time, varying from 40 seconds to 10 minutes.

20. The process of claim 13 wherein there is further comprising the step of post-curing the composition at a temperature above 200° C. for a period of time varying anywhere from 10 minutes to 4 hours.

21. An improved composition which is capable of being extruded and hot air vulcanized and which is not sticky in the cured form consisting essentially of
   (a) 100 parts by weight of organopolysiloxane gum composed of units expressed by the general formula $R_a^1 SiO_{(4-a)/2}$ where $R^1$ is a substituted or a non-substituted monovalent hydrocarbon group, of which 0.02-2 mole percent is an alkenyl group and a varies in the range of 1.98-2.00;
   (b) 30-100 parts by weight of a silica filler; and
   (c) 0.1-1.0 parts by weight of organohydrogenpolysiloxane possessing units expressed by the general formula $R_b^2 HcSiO_{(4-b-c)/2}$ where $R^2$ is a substituted or non-substituted monovalent hydrocarbon group, b and c are positive values, and the total of b plus c falls in the 1.0-3.0 range, and wherein the molecule contains at least 2 silicon bonded hydrogen atoms; wherein the improvement comprises the addition of a combination of 0.3 to 3 parts by weight of aromatic acyl organic peroxide and 0.1 to 2 parts by weight of alkyl organic peroxide catalysts effective for providing a non-sticky surface on said cured composition.

* * * * *